United States Patent [19]

Kanezashi

[11] Patent Number: 4,649,809
[45] Date of Patent: Mar. 17, 1987

[54] BEVERAGE VENDING MACHINE

[75] Inventor: Takeshi Kanezashi, Kiryu, Japan

[73] Assignee: Sanden Corporation, Gunma, Japan

[21] Appl. No.: 771,407

[22] Filed: Aug. 30, 1985

[30] Foreign Application Priority Data

Aug. 31, 1984 [JP] Japan ............................ 59-132429[U]

[51] Int. Cl.$^4$ .............................................. A47J 31/40
[52] U.S. Cl. ..................... 99/290; 99/323.2;
99/323.3; 141/82; 141/104; 222/129.4; 222/146.1
[58] Field of Search ............... 99/275, 279, 290, 323.2, 99/323.3, 484; 141/82, 104; 222/129.4, 146.1

[56] References Cited

U.S. PATENT DOCUMENTS 2,462,019 2/1949 Bowman ........................... 222/129.4
2,712,887 7/1955 King ....................................... 99/275
4,416,194 11/1983 Kemp ..................................... 141/82
4,448,113 5/1984 Brabon ................................... 99/290
4,470,999 9/1984 Carpiac ................................. 99/275

Primary Examiner—Robert W. Jenkins
Attorney, Agent, or Firm—Banner, Birch McKie & Beckett

[57] ABSTRACT

A beverage dispensing machine includes a hot beverage serving element and cold beverage serving element for selective use. The cold beverage serving element comprises a carbonated beverage producing device and non-carbonated beverage producing device, the non-carbonated beverage being produced from hot beverage. The hot beverage serving element is provided with two discharge ducts for conducting the brewed beverages and one of the ducts passes through a cooled water tank for cooling the hot beverage to be served as a cold drink.

6 Claims, 3 Drawing Figures

BEVERAGE VENDING MACHINE

BACKGROUND OF THE INVENTION

This invention relates to beverage vending machines, and more particulary, to improvements in such machines which selectively dispense hot drinks and cold drinks while utilizing flavoring ingredients including carbonated and non-carbonated water.

Various types of beverage vending machines are well known in prior patents and are already used in the market place. In one vending machine type for selectively dispensing a hot beverage and a cold beverage, the cold beverage which is produced from non-carbonated water is brewed from a hot beverage which is thereafter cooled down. One way to cool down the hot beverage for serving as a cold beverage is to mix it with ice or cooled water but the taste of such a cold beverage when dispensed would be diluted by the ice water. Another way to cool down the hot beverage is to set up a refrigerating unit for refrigerating around the duct which conducts the hot beverage to the vending cup. However, with a vending machine provided with a refrigerating apparatus used solely for cooling the hot beverage, the size and cost of the vending machine is unduly increased.

SUMMARY OF THE INVENTION

It is a primary object of this invention to provide an improved beverage dispensing machine which will selectively dispense hot and cold beverages produced from hot water and/or carbonated water.

It is another object of this invention to provide a beverage dispensing machine in which cold beverages are not diluted by any other water to maintain the desired taste of the dispensed beverages.

It is still another object of this invention to provide a beverage dispensing machine which is simple in construction and of reduced cost.

It is a further object of this invention to provide a beverage dispensing machine which can be utilized in prior types of vending machines with only slight modifications.

A beverage vending machine in accordance with this invention includes a hot beverage serving device and a cold beverage serving device for selectively dispensing hot and cold beverages. The hot beverage serving device comprises a hot water supply tank and a brewing element.

The cold beverage serving device comprises a water cooling tank filled with water and a refrigerating unit which has its refrigerant coil disposed in the water within the water cooling tank. A carbonator is partly submerged in the water of the water cooling tank, the carbonator being connected with a plain water supply line and a carbonated water discharge line. A raw material supply line delivers the raw material flavoring ingredients for the soft drink, such as a syrup, into a cup. An ice making device produces ice to be supplied into the cup to produce the vended beverage.

The hot beverage serving device is provided with two discharge ducts. One of the discharge ducts conducts the hot beverage from a brewing element to a vending cup which is placed in the hot beverage vending position. The other discharge duct passes through a cooling tank for cooling the hot beverage to produce the cold beverage. The cooling tank is filled with water supplied from a mid-portion of the plain water supply line for the cold beverage serving device. Selection between these two discharge ducts is made in accordance with the customer's preference.

Further objects, features and other aspects of this invention will be understood from the following detailed description of the preferred embodiment of this invention with reference to the annexed drawings.

DETAILED DESCRIPTION OF THE PREFERRED EMBODIMENTS

Figure 1:
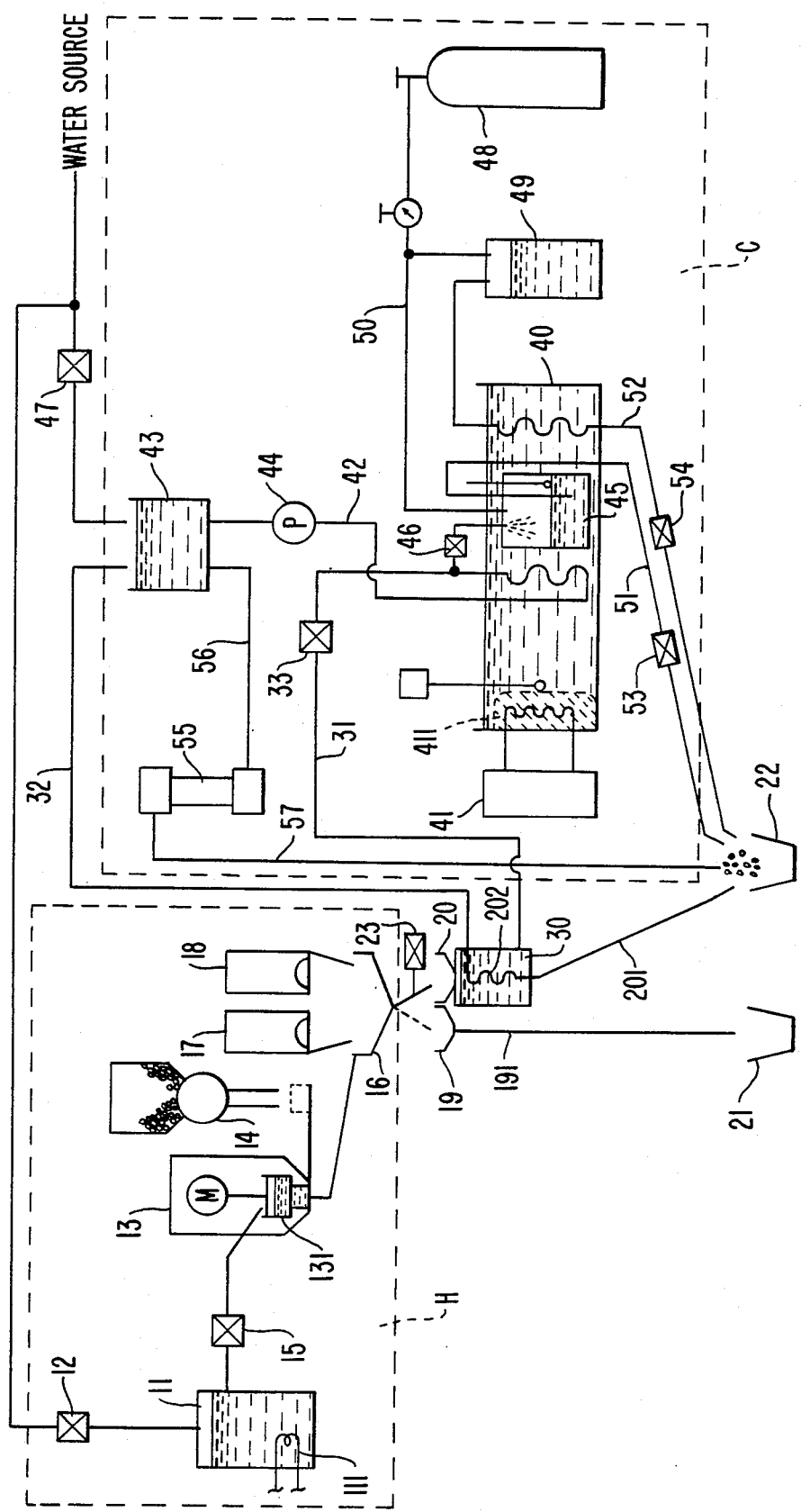
FIG. 1 is a schematic view of a beverage dispensing device in accordance with one embodiment of this invention.

Referring to FIG. 1, the basic construction of a beverage dispensing machine according to this invention is shown. The dispensing machine includes a hot beverages brewing device H and a cold beverage serving device C for selectively dispensing hot or cold beverages within one machine in accordance with the customer's preference.

Hot beverage brewing device H comprises a hot water supply tank 11 which is provided with an electrical heater 111 for heating the water within tank 11. Tank 11 is connected with a water source through an electro magnetic valve 12 and also with a hot beverage brewing element, for example, a coffee brewing element 13. The hot water in tank 11 is supplied into a cylinder 131 of brewing element 13 for extracting coffee while the ground coffee is supplied from a coffee mill 14. An electro magnetic valve 15 controls supply of the hot water and the extracted coffee is conducted into a first outlet conduit 16 for mixing with a suitable amount of sugar and/or cream, each of which is supplied from canisters 17 and 18, respectively.

Below the discharge opening from first outlet conduit 16, two second outlet conduits 19 and 20 are disposed to selectively receive the extracted coffee. As shown in FIG. 1, a discharge duct 191 from one conduit 19 is positioned to introduce the extracted coffee into a cup 21 located at a hot beverage dispensing station. On the other hand, the discharge duct 201 from the other conduit 20 passes through a cooled water tank 30 by way of a coiled portion 202 in duct 201 and thereafter introduces the extracted coffee into a cup 22 placed at a cold beverage dispensing station. The discharge of the extracted coffee from the first outlet conduit 16 to one or the other of the second outlet conduits 19 or 20 controlled by an electro magnetic solenoid 23, with the control of solenoid 23 being determined by the customer's beverage selection.

Cold beverage serving device C includes a water cooling tank 40 filled with water. A cooling coil 411, which is connected with a refrigerating unit 41 to form a refrigerant circuit, is disposed in the water of water cooling tank 40. A plain water supply line 42 has a portion coiled and immersed within the water within cooling water tank 40. Line 42 is connected to a reserve tank 43 by way of pump 44. A branch of line 42 is connected to a carbonator 45 through a solenoid valve 46 to supply plain water from reserve tank 43 due to the pumping operation of pump 44. The stored amount of water in reserve tank 43 is controlled by a solenoid valve 47 in the water source line.

Carbonator 45 is located in the water of water cooling tank 40 with almost all portions being submerged in the water. Carbonator 45 is charged with carbon dioxide gas from a cylinder 48 containing compressed carbon dioxide gas through a pipe line 50. Therefore, the plain water supplied into carbonator 45 from reserve tank 43 is carbonated in carbonator 45 to provide high carbonated water. The high carbonated water exits from carbonator 45 through carbonated water supply line 51 leading to cup 22 placed at a cold beverage dispensing station. The syrup, which is contained in container 49, is supplied into cup 22 through syrup supply line 52 to produce the vended carbonated drink. Carbon dioxide gas contained in cylinder 48 is also introduced into syrup container 49. Solenoid valves 53 and 54 are placed in the carbonated water supply line 51 and syrup supply line 52, respectively, to control the supply of carbonated water and syrup into cup 22.

The cold beverage serving device is also provided with an ice making device 55. Plain water is supplied into ice making device 55 from reserve tank 43 through supply line 56. Ice making device 55 has an ice discharge conduit 57 for introducing the ice from ice making device 55 to cup 22.

The water in cooled water tank 30 is supplied from reserve tank 43 through plain water supply line 42 by the end of water conduit line 31 being connected to the portion of plain water supply line 42 which is disposed on one side of coiled portion of plain water supply line 42 and solenoid valve 46. Cooled water tank 30 is also connected to reserve tank 43 through water return line 32 to form the heat exchange water return circuit. The circulation of cooled water through water conduit line 31 is controlled by the operation of solenoid valve 33.

Figure 2:
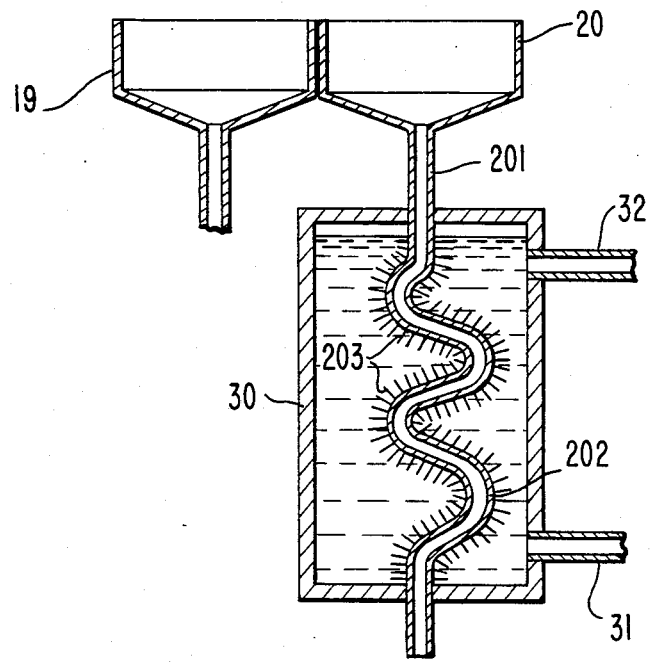
FIG. 2 is a enlarged schematic view of part of the dispensing device shown in FIG. 1 illustrating the cooling mechanism for the hot beverage to produce the cold beverage.
Figure 3:
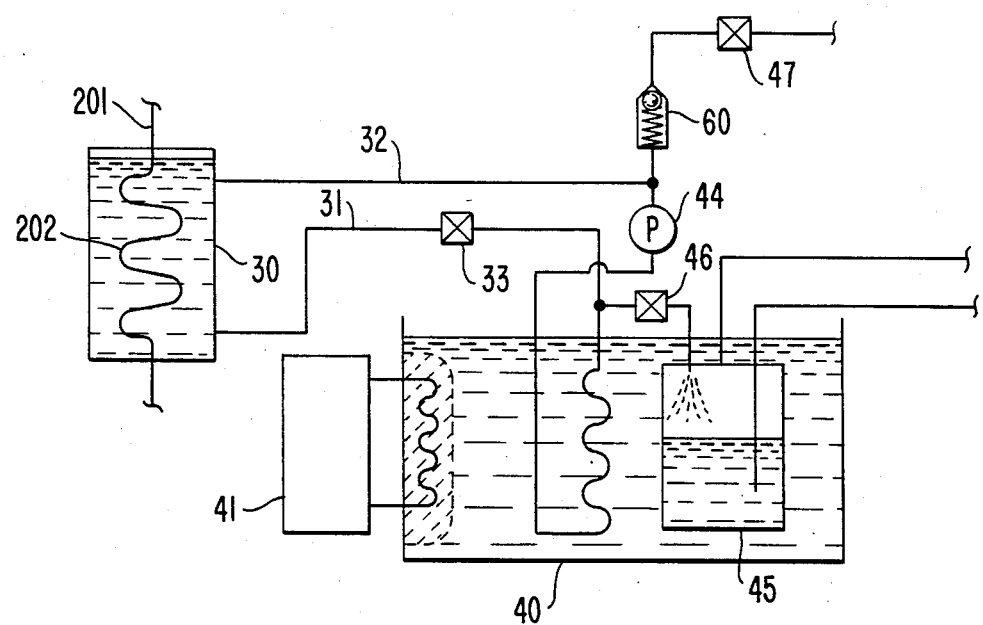
FIG. 3 is a partial schematic view of a beverage dispensing device in accordance with another embodiment of this invention.

As clearly shown in FIG. 2, discharge duct 201 from second conduit 20 has a portion 202 coiled within cooled water tank 30, this portion being provided with a plurality of heat exchange fins 203 to promote heat exchange at its outer peripheral surface. In the embodiment of FIG. 2, reserve tank 43 functions as a component of the cooling water circulating loop. Alternatively, a check valve 60 can function as the reserve tank as shown in FIG. 3. That is, when return line 32 is connected with the connecting line portion between check valve 60 and pump 44 the cooling water circulating loop for cooled water tank 30 is completed.

If a customer wants to drink the hot beverage, for example hot coffee, hot coffee is produced by hot beverage serving device H. The coffee is extracted in coffee brewing element 13 and is introduced into first conduit 16 for mixture, if preferred, with sugar and/or cream. Then, the extracted coffee is introduced into cup 21 through the second conduit 19 by the customer selected operation of solenoid valve 23.

On the other hand, should the customer want to drink the non-carbonated cold beverage, for example, cold coffee, cold coffee is produced from the extracted hot coffee, i.e., the extracted coffee disposed in first conduit 16. This hot coffee is introduced into the second conduit 20 by the customer selected operation of solenoid valve 23, and thereafter, passed through coiled portion 202 of discharge duct 201 for cooling the extracted coffee by the cold water in cooling water tank 30. Therefore, coffee supplied into cup 22 which is placed at a cold beverage dispensing station is sufficiently cooled down.

Also, if a customer wants to drink a carbonated cold beverage, this cold beverage is produced by the cold beverage serving device C in the usual manner.

As mentioned above, the non-carbonated beverage is usually cooled down by the cooling water filling cooling water tank 30 which is supplied from a water source and cooled down by cold beverage serving device C. Therefore, the non-carbonated beverage can be cooled down without any special cooling device and the desired taste thereof maintained. Thus a small compact size for a vending machine which includes a hot beverage serving device, and a carbonated and non-carbonated cold beverage serving device is provided.

This invention has been described in detail in connection with preferred embodiments, but these embodiments are examples only and the invention is not to be considered as restricted thereto. It will be easily understood by those skilled in the art that other variations and modifications can be easily made within the scope of the appended claims.

What is claimed is:

1. In a beverage dispensing machine including a hot beverage serving device and a cold beverage serving device for selectively dispensing hot and cold beverages from one machine, said hot beverage serving device comprising a hot water supply tank and a brewing element, and said cold beverage serving device comprising a water cooling tank, a refrigerating unit having a refrigerated coil in said water tank to cool down the water in said water cooling tank, a carbonator at least partly submerged in the water within said water cooling tank, said carbonator being connected to a plain water supply line and having a carbonated water discharge line, a raw material supply line for beverage material, and an ice making device to produce ice for supply to a vending cup, the improvement comprising said hot beverage serving device including two discharge ducts which may be selectively used, one of said discharge ducts being disposed to conduct hot beverage from said brewing element to a vending cup, and the other of said discharge ducts passing through a cooling tank filled with water which is supplied from said plain water supply line for introducing the originally hot beverage into a vending cup after being cooled down by heat exchange with the water in said cooling tank.

2. The beverage dispensing machine of claim 1 wherein the water in said cooling tank is circulated through a closed water circuit which is in communication with water source supply means for said closed circuit disposed between said plain water supply line and the water return line leading from said cooling tank.

3. The beverage dispensing machine of claim 2 wherein said water source supply means is a reserve tank.

4. The beverage dispensing machine of claim 2 wherein said water source supply means is a check valve in said plain water supply line.

5. The beverage dispensing machine of claim 1 wherein said other discharge duct has a coiled portion disposed in said cooling tank.

6. The beverage dispensing machine of claim 5 wherein said coiled portion is provided with a plurality of heat exchange fins on the outer peripheral surface thereof.

* * * * *